United States Patent Office 3,758,428
Patented Sept. 11, 1973

3,758,428
ACRYLIC COATING COMPOSITIONS
William Connelly, Leonard Sydenham, and John Szilagyi, Toronto, Ontario, Canada, assignors to Canadian Industries Limited, Montreal, Quebec, Canada
No Drawing. Continuation-in-part of application Ser. No. 52,064, July 2, 1970. This application Nov. 15, 1971, Ser. No. 198,945
Int. Cl. C08b 21/08; C08f 29/38, 45/22
U.S. Cl. 260—17 R    12 Claims

ABSTRACT OF THE DISCLOSURE

Coating compositions comprising an organic solvent and as the essential film-forming materials, (1) at least 40 parts by weight of acrylic polymeric material selected from (a) copolymers of essentially, at least 75 parts by weight of methyl methacrylate and from 0.5 to 25 parts by weight of glycidyl acrylate or methacrylate, the total parts of the copolymer ingredients being 100, esterified with an aromatic monocarboxylic acid, selected from the group consisting of toluic acid, cinnamic acid, benzoic acid and benzoic acids substituted with at least one polar group, e.g. amino-benzoic acids and (b) mixtures of said esterified copolymers with homo- or copolymers of methyl methacrylate; (2) up to 50 parts by weight of at least one compatible plasticiser; and (3) up to 35 parts by weight of cellulose acetate butyrate, the total parts by weight of film-forming materials being 100; the glycidyl acrylate or methacrylate moiety of any copolymer (a) prior to esterification thereof constituting from about 0.5% to about 25% by weight of ingredient (1) of the essential film-forming materials, and when the acrylic polymeric film-forming material is a mixture (b), said esterified copolymer (a) being present in an amount exceeding 200% by weight of any pigment present in the compositions.

---

This application is a continuation-in-part of the now abandoned application Ser. No. 52,064, filed on July 2, 1970.

This invention relates to novel coating compositions of the type commonly referred to as acrylic lacquers and, more particularly, to coating compositions comprising as their film-forming ingredient an esterified copolymer of methyl methacrylate and glycidyl acrylate or methacrylate.

Coating compositions containing polymers of methyl methacrylate as their principal film-forming constituents can be applied to substrates and dried thereon to form films having outstanding durability and high gloss retention during prolonged outdoor exposure. Because of this quality, polymethyl methacrylate lacquers have been found particularly useful for the finishing of automobile bodies as well as other metallic articles subject to outdoor exposure. Such lacquers, however, have a serious limitation in that they do not adhere well to conventional primer coatings usually applied on metals. Because of this limitation, when polymethyl methacrylate lacquers are applied to a substrate which has previously received a coat of a conventional primer, it is necessary to apply an intermediate coat of a sealing lacquer between the primer coat and the top coat of polymethyl methacrylate.

The primary object of this invention is to provide novel acrylic coating compositions or lacquers which show good adherence to conventional primers as well as good durability and high gloss retention on outdoor exposure.

A secondary object is to dispense with the necessity of applying an intermediate coat of a sealing lacquer in the circumstances and manner hereinbefore mentioned.

The above as well as other objects will clearly appear hereinafter.

The coating compositions in accordance with this invention comprise an organic solvent and, as the essential film-forming materials, (1) at least 40 parts by weight of acrylic polymeric material selected from (a) copolymers of essentially, at least 75 parts by weight of methyl methacrylate and from 0.5 to 25 parts by weight of glycidyl acrylate or methacrylate, the total parts of the copolymer ingredients being 100, esterified with an aromatic monocarboxylic acid selected from the group consisting of toluic acid, cinnamic acid, benzoic acid and benzoic acids substituted with at least one polar group, and (b) mixtures of said esterified copolymers with homopolymers of methyl methacrylate or with copolymers of methyl methacrylate and a monomer copolymerisable therewith selected from the group consisting of the alkyl esters of acrylic acid and methacrylic acid, vinyl acetate, acrylonitrile and styrene; (2) up to 50 parts by weight of at least one compatible plasticizer; and (3) up to 35 parts by weight of cellulose acetate butyrate, the total parts by weight of film-forming materials being 100; the glycidyl acrylate or methacrylate moiety of any copolymer (a) prior to esterification thereof constituting from 0.5% to about 25% by weight of ingredient (1) of the essential film-forming materials, and when the acrylic polymeric film-forming material is a mixture (b), said esterified copolymer (a) being present in an amount exceeding 200% by weight of any pigment present in the compositions.

The copolymer hereinbefore defined as containing essentially, methyl methacrylate and glycidyl acrylate or methacrylate moieties may, in addition to these essential monomers, contain moieties of other copolymerisable ethylenically unsaturated monomeric material which does not react with the glycidyl moiety of the copolymer. Such copolymerisable material includes, for example, the alkyl esters of acrylic acid and methacrylic acid, vinyl acetate, acrylonitrile and styrene. Preferred copolymers are those derived from the monomers methyl methacrylate and glycidyl acrylate or methacrylate in a weight ratio of 90–99: 10–1, and particularly preferred is that derived from said monomers in a weight ratio of 95:5.

The esterified copolymers constituting the whole or part of ingredient (1) of the coating compositions of this invention, are preferably prepared by first forming a copolymer containing moieties of methyl methacylate and glycidyl acrylate or methacrylate in the above defined proportions and, if desired, a minor amount of moieties of copolymerisable monomer, and then esterifying the resulting copolymer with the aromatic monocarboxylic acid.

The copolymer may be prepared by any of the well known polymerisation methods, viz by granular, emulsion or solution polymerisation of the comonomers. A preferred method of preparing the copolymer involves introducing suitable proportions of the comonomers together with a solvent which may be a solvent for both the monomers and the copolymer and with a catalyst such as one of the well known organic peroxide catalysts, e.g. benzoyl peroxide, into a reaction vessel in which the mixture is heated with continuous agitation for a period of at least 2 hours followed by cooling. The copolymer is obtained in the form of an approximately 50% solids solution.

The copolymer is thereafter esterified by any suitable method. In a preferred method, the 50% solution of the copolymer as above obtained, is slightly diluted and brought to reflux in a reaction vessel. The esterifying acid in the form of a solution is then added with a catalyst and the reaction is allowed to proceed until the desired degree of esterification has been reached.

The resulting ester link is of the type produced by reacting a carboxyl group with an epoxy group in that the opening of the epoxy ring results not only in the production of an ester link to one carbon atom but also in the production of an hydroxyl group on an adjacent carbon atom.

As indicated earlier, the acid which may be used to esterify the glycidyl moiety of the copolymer may be one of toluic acid, cinnamic acid, benzoic acid and benzoic acids substituted with at least one polar group. Typical polar groups which may be substituted on the benzoic acid nucleus and their approximate dipole moments are:

($10^{-18}$ e.s.u.)

| | |
|---|---|
| 4.5 | $-NR_3^+$, $-SO_3$, $-COO$, betaines $-R_3N^+CH_2CO_2$ |
| 4.0 | $-CN$, $-NC$, $-RN=C=O$, $-RN=C=S$, $-NO_2$ |
| 3.0 | $-COCl_2$, $-NO$ |
| | sulphones $R\!\!>\!\!SO_2$, sulphoxides $R\!\!>\!\!S \longrightarrow O$ |
| | nitrites, nitrates, amine oxides $-R_3N \longrightarrow O$ |
| 2.8 | $-$ketones$-\underset{\overset{\|}{O}}{C}-R$, $-\underset{\overset{\|}{O}}{C}-H$ |
| | oximes— $C=NOH$ |
| 2.5 | $-SO_2NH_2$, $-CF_3$, $-CCl_3$, $-CHCl_2$, $-CH_2Cl$ |
| 2.0 | $-SO_3H$, $-COOR$ |
| 1.5 | $-OH$, halogen, $-NHCOR$ |
| 1.3 | $-OR$, $-SR$ |
| 1.0 | $-NH_2$, $-NHR$, $-NR_2$ |

R signifies an alkyl or aryl group.

This list gives numerical values without reference to direction.

Of the above polar groups, hydroxy, amino and methoxy groups have been found to constitute a preferred class. However, the greatest increase in adhesion is observed when either para-aminobenzoic acid or para-methoxybenzoic acid is employed to esterify the glycidyl moiety of the copolymer.

The essential features of the lacquers or coating compositions of this invention are that the acrylic polymeric material forming one of the essential film-forming materials thereof must comprise the esterified copolymer hereinbefore described and in such proportions that the adhesion promoting moiety thereof, i.e. the glycidyl acrylate or methacrylate moiety, prior to esterification, constitutes from about 0.5% to about 25% of the total weight of said polymeric material. It has been found unnecessary to include more than 25% by weight of glycidyl acrylate or methacrylate in the acrylic polymer component of the film-forming materials as no further advantage seems to be gained by doing so. In most cases the acrylic polymer should contain preferably from about 1% to about 10% by weight of the glycidyl acrylate or methacrylate moiety.

In order to clearly understand the essential feature of this invention, it should be noted that the increase in adhesion is observed when the coating composition contains a copolymer, the glycidyl moiety of which has been esterified with either a substituted aromatic acid, e.g. para-aminobenzoic acid or an unsubstituted aromatic acid, i.e. benzoic acid. As would be expected, the degree of this effect does vary according to the polarity of the substituent or the lack thereof. As has been pointed out earlier, para-aminobenzoic acid and para-methoxybenzoic acid appear to exhibit the effect to the greatest degree. However, central to achieving this increased adhesion is the use of an esterified copolymer as herein described, the choice of esterifying acid being of, at most, secondary importance.

The viscosity average molecular weight of the film-forming acrylic polymeric material (including both the esterified copolymer and methyl methacrylate homo- or copolymer) should be in the range of 40,000 to 150,000 and, in the case of automotive lacquers, should be between 75,000 and 100,000. By using a film-forming polymer in these ranges and especially in the latter, it is possible to produce sprayable lacquers of high solids, such as lacquers of from about 12% to 20% by weight of non-volatile solids concentration.

The lacquers may contain one or more plasticizers in an amount of up to 50%, preferably from 20% to 40% by weight of the film-forming materials. Generally the plasticizers suitable for use in the coating compositions of the invention are those which are compatible with the other film-forming materials, i.e. do not react with, or appreciably separate from, the other film-forming materials of the formulated coating compositions. A preferred plasticizer is an oil-free polyester which is particularly compatible with, and has a very low tendency to separate from, acrylic polymers. Most preferred is the oil-free polyester obtained by reacting through known methods neopentyl glycol, adipic acid, phthalic anhydride and butyl alcohol in a mole ratio of 3-2:2-2 respectively.

Other suitable plasticizers are monocarboxylic acid-modified alkyl resins. The preferred alkyd resins have an oil length of from 15 to 55, preferably 20 to 35, and from 1% to 6%, preferably 3% to 5%, of unreacted hydroxyl. A still preferred alkyd resin is one modified with coconut oil.

Examples of other plasticizers that are suitable include benzyl butyl phthalate, dibutyl phthalate, triphenyl phosphate, 2-ethyl hexyl benzyl phthalate and dicyclohexyl phthalate. The particular plasticizer and the amount thereof used are chosen in accordance with the demand for compatibility and film properties.

The lacquers of this invention may also contain up to 35, preferably from 10 to 25, parts by weight of cellulose acetate butyrate by weight of the film-forming materials. The cellulose acetate butyrate can be any of the lacquer grade materials conventionally used in the coating art.

In formulating the lacquers, the film-forming materials are dissolved in an organic solvent which can be any of the well known organic solvents commonly used in the lacquer art. Suitable solvents are, for example, toluene, xylenes, acetone, methyl ethyl ketone, methyl isobutyl ketone, methyl isopropyl ketone, amyl alcohol, ethylene dichloride, cyclohexanone, and aromatic hydrocarbon mixtures. While certain of these solvents cannot be used alone because of lack of solvent power for one or more of the film-forming materials, they can be used in admixture with others.

The coating compositions of this invention generally include pigments but may, in certain occasions, be employed in the form of clear lacquers. Where however the compositions contain pigments and comprise as ingredient (1) of the essential film-forming materials, mixtures of the above-defined esterified copolymers with homopolymers of methyl methacrylate or with copolymers of methyl methacrylate and an ethylenically unsaturated monomer copolymerisable therewith, the esterified copolymer must be present in an amount exceeding 200% by weight of said pigments. Examples of pigments are metal oxides, hydroxides, chromates, silicates, sulfides, sulfates, carbonates and carbon blacks, organic dyestuffs and likes thereof, and metal flake pigments.

The coating compositions of this invention can also include any of the additives which are commonly used in conventional lacquers such as dispersing agents, flow control agents, etc.

The lacquers of the present invention have the very important advantage that they can be applied directly and adhere very well to conventional metal-protecting and rust-inhibiting prime coats to which methyl methacrylate lacquers of the prior art characteristically do no adhere appreciably. The metal primers to which the instant lacquers may be applied include, for example, the drying oil-modified alkyd resins, rosin-modified alkyd resins, mixtures of alkyd and aminoplast resins, mixtures of alkyd and epoxy resins, mixtures of alkyd, aminoplast and epoxy resins, mixtures of epoxidised esters of higher fatty acids and aminoplast resins, etc.

The lacquers may be applied to primed substrates by any of the conventional techniques e.g. by spray, brush, dip coating, etc. The coating is thereafter baked at a temperature of from about 200° F. to about 300° F. or more. The higher the baking temperature, the shorter is the drying time.

The following examples are intended to illustrate the invention and not to limit it in any way. Parts are by weight unless otherwise specified.

EXAMPLE 1

A 97/3 methyl methacrylate/glycidyl methacrylate copolymer was prepared by refluxing for 2.5 hours a mixture of

| | Parts |
|---|---|
| Methyl methacrylate | 1564 |
| Glycidyl methacrylate | 36 |
| Toluene | 1120 |
| Methyl isobutyl ketone | 480 |
| Benzoyl peroxide | 11.6 | to produce a solution containing about 50% by weight of a copolymer having a reduced viscosity of 0.306 determined on a 0.5% solution in ethylene dichloride at 25° C.

The above solution was diluted to 35% solids with methyl isobutyl ketone and esterified with p-amino benzoic acid by refluxing for 12.5 hours a mixture of:

| | Parts |
|---|---|
| Copolymer solution (35%) | 2860 |
| p-Amino benzoic acid | 29 |
| Dimethyl tertiary amine | 10 |

A lacquer was prepared containing the resulting esterified copolymer, cellulose acetate butyrate, coconut oil modified alkyd resin, polymethyl methacrylate and a pigment in a 36.1:20.6:30.9:8.5:3.9 approximate weight ratio.

This lacquer when applied to a primed steel surface to which conventional lacquers do not adhere well, and baked thereon for 30 minutes at 300° F., produced a film having particularly good adhesion to said primed steel surface.

EXAMPLE 2

A 90/10 methyl methacrylate/glycidyl methacrylate copolymer was prepared by refluxing for 2.5 hours a mixture of:

| | Parts |
|---|---|
| Methyl methacrylate | 1080 |
| Glycidyl methacrylate | 120 |
| Toluene | 840 |
| Methyl isobutyl ketone | 360 |
| Benzoyl peroxide | 8.7 | to produce a solution containing about 50% by weight of copolymer having a reduced viscosity of 0.277 determined on a 0.5% solution in ethylene dichloride at 25° C.

The solution was diluted to 40% solids with a mixture of toluene and isopropyl alcohol in a 5:1 weight ratio and esterified with p-amino benzoic acid by refluxing for 6.5 hours a mixture of:

| | Parts |
|---|---|
| Copolymer solution (40%) | 500 |
| p-Amino benzoic acid | 19.3 |

A lacquer was prepared containing the resulting esterified copolymer, cellulose acetate butyrate, coconut oil modified alkyl resin, polymethyl methacrylate and a pigment in a 39.3:21.9:32.8:4.2:1.8 approximate weight ratio.

The lacquer, when applied to a primed steel surface and baked thereon for 30 minutes at 300° F., resulted in a film having good adhesion to primer coat.

EXAMPLE 3

A 99/1 methyl methacrylate/glycidyl methacrylate copolymer was prepared by refluxing for 2.5 hours a mixture of:

| | Parts |
|---|---|
| Methyl methacrylate | 1584 |
| Glycidyl methacrylate | 16 |
| Toluene | 1120 |
| Methyl isobutyl ketone | 480 |
| Benzoyl peroxide | 11.6 | to produce a solution containing about 50% by weight of copolymer having a reduced viscosity of 0.254 determined on a 0.5% solution in ethylene dichloride at 25° C.

The solution was diluted to 40% solids with methyl isobutyl ketone and esterified with p-amino benzoic acid by refluxing for 7.5 hours a mixture of:

| | Parts |
|---|---|
| Copolymer solution (40%) | 250 |
| p-Amino benzoic acid | 0.97 |
| Nitrobenzene | 83.3 |
| Dimethyl tertiary amine | 0.5 |

A lacquer containing the resulting esterified copolymer but otherwise similar to that described in Example 2 was prepared.

The lacquer when applied and baked as in Example 2 gave a film having improved adhesion to primer coat as compared to films of conventional lacquers.

EXAMPLE 4

A 75/25 methyl methacrylate/glycidyl methacrylate copolymer was prepared by refluxing for 2.5 hours a mixture of:

| | Parts |
|---|---|
| Methyl methacrylate | 1200 |
| Glycidyl methacrylate | 400 |
| Toluene | 1120 |
| Methyl isobutylketone | 480 |
| Benzoyl peroxide | 11.6 | to produce a solution containing about 50% by weight of copolymer having a reduced viscosity of 0.377 determined on a 0.5% solution in ethylene dichloride at 25° C.

The solution was diluted to 40% solids with methyl isobutyl ketone and esterified with p-nitro benzoic acid by refluxing for 3.25 hours a mixture of:

| | Parts |
|---|---|
| Copolymer solution (40%) | 250 |
| Nitrobenzene | 36 |
| p-Nitro benzoic acid | 29.5 |
| Dimethyl tertiary amine | 0.5 |

The resulting esterified lacquer was formulated into a lacquer similar to that described in Example 2 except for the substitution of the esterified copolymer.

The lacquer, when applied and baked as in Example 2 gave a film having improved adhesion as compared with films of conventional lacquers.

EXAMPLE 5

A 95/5 methyl methacrylate/glycidyl methacrylate copolymer was prepared by refluxing for 2.5 hours a mixture of:

| | Parts |
|---|---|
| Methyl methacrylate | 1520 |
| Glycidyl methacrylate | 80 |
| Toluene | 1120 |
| Methyl isobutyl ketone | 480 |
| Benzoyl peroxide | 11.6 | to produce a solution containing about 50% by weight of a copolymer having a reduced viscosity of 0.31 determined on a 0.5% solution in ethylene dichloride/ethanol 95/5 at 25° C.

The solution was diluted to 40 % solids with methyl isobutyl ketone and esterified with benzoic acid by refluxing for 13 hours a mixture of:

| | Parts |
|---|---|
| Copolymer solution (40%) | 250 |
| Methyl isobutyl ketone | 83.3 |
| Benzoic acid | 4.3 |
| Dimethyl tertiary amine | 1.5 |
| Nitrobenzene | 30 |

A lacquer containing the resulting esterified copolymer but otherwise similar to that described in Example 2 was prepared.

When applied to a primed steel surface and baked thereon as in Example 2, the lacquer produced a dried film having very good adherence to the primer coat.

EXAMPLE 6

A 95/5 methyl methacrylate/glycidyl methacrylate copolymer in 40% solids solution such as obtained in Example 5 was esterified with p-hydroxy benzoic acid by refluxing for 12.5 hours a mixture of:

| | Parts |
|---|---|
| Copolymer solution | 250 |
| Methyl isobutyl ketone | 83.3 |
| p-Hydroxy benzoic acid | 4.86 |
| Nitrobenzene | 30 |
| Dimethyl tertiary amine | 1.5 |

A lacquer containing the resulting esterified copolymer but otherwise similar to that described in Example 2 was prepared.

The lacquer when applied and baked as in Example 2 gave a film having very good adhesion to primer coat.

EXAMPLE 7

A 95/5 methyl methacrylate/glycidyl methacrylate copolymer in 50% solids solution such as obtained in Example 5 was diluted to 35% solids with methyl isobutyl ketone and esterified with cinnamic acid by refluxing for 4 hours a mixture of:

| | Parts |
|---|---|
| Copolymer solution (35%) | 286 |
| Nitrobenzene | 47 |
| Cinnamic acid | 5.22 |
| Dimethyl tertiary amine | 1.5 |

The resulting esterified copolymer was formulated into a lacquer similar to that described in Example 2 except for the substitution of the esterified copolymer.

When applied to a primed steel surface and baked thereon as in Example 2, the lacquer resulted in a dried film which has improved adherence to the primer coat as compared with films of conventional lacquers.

EXAMPLE 8

A 95/5 methyl methacrylate/glycidyl methacrylate copolymer in 35% solids solution such as obtained in Example 7 was esterified with p-toluic acid by refluxing for 4.5 hours a mixture of:

| | Parts |
|---|---|
| Copolymer solution (35%) | 286 |
| Nitrobenzene | 47 |
| p-Toluic acid | 4.8 |
| Dimethyl tertiary amine | 1.5 |

A lacquer containing the resulting esterified copolymer but otherwise similar to that described in Example 2 was prepared.

This lacquer, when applied and baked as in Example 2, gave a film having good adhesion to primer coat.

EXAMPLE 9

A 95/5 methyl methacrylate/glycidyl methacrylate copolymer in 50% solids solution such as obtained in Example 5 was diluted to 40% solids with methyl isobutyl ketone and esterified with p-amino-benzoic acid by refluxing for 12 hours a mixture of:

| | Parts |
|---|---|
| Copolymer solution (40%) | 3000 |
| p-Amino benzoic acid | 58 |
| Methyl isobutyl ketone | 420 |
| Dimethyl tertiary amine | 6 |

A lacquer was prepared by adding to a lacquer made from a commercial polymethyl methacrylate, about 10% by weight of the above-obtained esterified copolymer solution. The resulting lacquer contained the esterified copolymer, cellulose acetate butyrate, coconut oil modified alkyd resin, polymethyl methacrylate and pigment in a 9.4:17.8:26.6:42.8:3.4 approximate weight ratio.

This lacquer, when applied to a primed steel surface to which conventional lacquers do not adhere well, and baked thereon for 30 minutes at 300° F. produced a film having particularly good adhesion to said primed steel surface.

EXAMPLE 10

A 95/5 methyl methacrylate/glycidyl acrylate copolymer was prepared by polymerizing a mixture of:

| | Parts |
|---|---|
| Methyl methacrylate | 1520 |
| Glycidyl acrylate | 80 |
| Toluene | 1120 |
| Methyl isobutyl ketone | 480 |
| Benzoyl peroxide | 11.6 | to produce a solution containing about 50% by weight of copolymer.

The solution was diluted to 40% solids with methyl isobutyl ketone and esterified with p-amino benzoic acid by refluxing for 4 hours a mixture of:

| | Parts |
|---|---|
| Copolymer solution (40%) | 375 |
| Methyl isobutyl ketone | 52.5 |
| Toluene | 1.0 |
| p-Amino benzoic acid | 8.02 |
| Dimethyl tertiary amine | 1.5 |

A lacquer was prepared containing the resulting esterified copolymer cellulose acetate butyrate, an oil-free polyester, polymethyl methacrylate, and pigment in a 9.1:21.5:23.8:43.2:2.4 approximate solids weight ratio.

This lacquer, when applied to a primed steel surface to which conventional lacquers do not adhere well, and baked thereon for 30 minutes at 310° F., produced a film having particularly good adhesion to said primed steel surface.

EXAMPLE 11

A 95/5 methyl methacrylate/glycidyl acrylate copolymer was prepared as in Example 10, and the resulting 50% solution was diluted with methyl isobutyl ketone until the solids content thereof was 40%. The copolymer was then esterified with p-methoxy benzoic acid by refluxing for 8 hours a mixture of:

| | Parts |
|---|---|
| Copolymer solution (40%) | 375 |
| Methyl isobutyl ketone | 52.5 |
| Toluene | 1.0 |
| p-Methoxy benzoic acid | 8.9 |
| Dimethyl tertiary amine | 1.5 |

A lacquer was prepared containing the resulting esterified copolymer, cellulose acetate butyrate, benzyl butyl phthalate, polymethyl methacrylate, and pigment in a 9.1:21.5:23.8:43.2:2.4 approximate solids weight ratio.

This lacquer, when applied to a primed steel surface to which conventional lacquers do not adhere well, and baked thereon for 30 minutes at 310° F., produced a film having good adhesion to said primed steel surface.

EXAMPLE 12

A 75/25 methyl methacrylate/glycidyl acrylate copolymer was prepared by polymerizing a mixture of:

| | Parts |
|---|---|
| Methyl methacrylate | 1200 |
| Glycidyl acrylate | 400 |
| Toluene | 1120 |
| Methyl isobutyl ketone | 480 |
| Benzoyl peroxide | 11.6 | to produce a solution containing about 50% by weight of copolymer.

The solution was diluted to 40% solids with methyl isobutyl ketone and esterified with p-methoxy benzoic acid by refluxing for 4¼ hours a mixture of:

| | Parts |
|---|---|
| Copolymer solution (40%) | 375 |
| Methyl isobutyl ketone | 52.5 |
| Toluene | 1.0 |
| p-Methoxy benzoic acid | 44.6 |
| Dimethyl tertiary amine | 1.5 |

A lacquer containing the resulting esterified copolymer but otherwise similar to that described in Example 9 was prepared.

The lacquer, when applied to a primed steel surface and baked thereon for 30 minutes at 310° F. resulted in a film having particularly good adhesion with films of conventional lacquers.

What we claim is:

1. A coating composition comprising an organic solvent and, as the essential film-forming materials, (1) at least 40 parts by weight of acrylic polymeric material selected from (a) copolymers of essentially, at least 75 parts by weight of methyl methacrylate and from 0.5 to 25 parts by weight of glycidyl acrylate or methacrylate, the total parts of the copolymer ingredients being 100, esterified with an aromatic monocarboxylic acid selected from the group consisting of toluic acid, cinnamic acid, benzoic acid and benzoic acids substituted with at least one polar group, and (b) mixtures of said esterified copolymers with homopolymers of methyl methacrylate or with copolymers of methyl methacrylate and a monomer selected from the group consisting of the alkyl esters of acrylic acid, methacrylic acid, vinyl acetate, acrylonitrile and styrene; (2) from about 20 to 50 parts by weight of at least one compatible plasticizer; and (3) from about 10 to 35 parts by weight of cellulose acetate butyrate, the total parts by weight of film-forming material being 100; the glycidyl acrylate or methacrylate moiety of any copolymer (a) prior to esterification thereof constituting from about 0.5% to about 25% by weight of ingredient (1); when the acrylic polymeric film-forming material is a mixture (b), the esterified copolymer (a) being present in an amount exceeding 200% by weight of any pigment present in the composition; and the percentage of non-volatile solids in the composition ranging from about 12% to 20% by weight.

2. A coating composition as claimed in claim 1 wherein the aromatic monocarboxylic acid is selected from benzoic acids substituted with at least one polar group.

3. A coating composition as claimed in claim 2 wherein the aromatic monocarboxylic acid is selected from para-amino benzoic acid, para-hydroxy benzoic acid and para-methoxy benzoic acid.

4. A coating composition as claimed in claim 3 wherein the aromatic monocarboxylic acid is selected from para-aminobenzoic acid and para-methoxy benzoic acid.

5. A coating composition as claimed in claim 1 wherein the plasticizer is selected from an oil-free polyester obtained by reacting neopentyl glycol, adipic acid, phthalic anhydride and butyl alcohol in a mole ratio of 3:2:2:2, a monocarboxylic acid-modified alkyd resin having an oil length of 15 to 55 and from 1% to 6% unreacted hydroxyl groups, benzyl butyl phthalate, dibutyl phthalate, triphenyl phosphate, 2-ethyl hexyl benzyl phthalate and dicyclohexyl phthalate.

6. A coating composition as claimed in claim 1 wherein the glycidyl acrylate or methacrylate moiety of the esterified copolymers prior to esterification constitutes from about 1% to about 10% by weight of ingredient (1) of the essential film-forming materials.

7. A coating composition as claimed in claim 1 wherein the glycidyl acrylate or methacrylate moiety of the esterified copolymers prior to esterification constitutes from about 1% to about 10% by weight of ingredient (1) of the essential film-forming materials, the plasticizer is present in an amount of about 20 to about 40 parts by weight and the cellulose acetate butyrate is present in an amount of about 10 to about 25 parts by weight.

8. A coating composition as claimed in claim 1 wherein the esterified copolymer prior to esterification is a copolymer of methyl methacrylate and glycidyl methacrylate.

9. A coating composition as claimed in claim 1 wherein the esterified copolymer prior to esterification is a polymer of 90 to 99 parts by weight of methyl methacrylate and 1 to 10 parts by weight of glycidyl methacrylate.

10. A coating composition as claimed in claim 1 wherein ingredient (1) of the essential film-forming materials is the esterified copolymer defined under (a) in said claim 1.

11. A coating composition as claimed in claim 1 wherein ingredient (1) of the essential film-forming materials is a mixture as defined under (b) in said claim 1.

12. A coating composition comprising an organic solvent and, as the essential film-forming materials (1) at least 40 parts by weight of acrylic polymeric material selected from (a) copolymers of esentially, at least 75 parts by weight of methyl methacrylate and from 0.5 to 25 parts by weight of glycidyl acrylate or methacrylate, the total parts of copolymer ingredients being 100, esterified with a benzoic acid substituted with at least one polar group, and (b) mixtures of said esterified copolymers with homopolymers of methyl methacrylate or with copolymers of methyl methacrylate and a monomer selected from the group consisting of the alkyl esters of acrylic acid, methacrylic acid, vinyl acetate, acrylonitrile and styrene; (2) from about 20 to 50 parts by weight of at least one compatible plasticizer; and (3) from about 10 to 35 parts by weight of cellulose acetate butyrate, the total parts by weight of film-forming materials being 100; the glycidyl acrylate or methacrylate moiety of any copolymer ingredient (1) prior to esterification thereof constituting from about 0.5% to about 25% by weight of ingredient (1); when the acrylic polymeric film-forming material is a mixture (b), the esterified copolymer (a) being present in an amount exceeding 200% by weight of any pigment present in the composition; and the percentage of non-volatile solids in the composition ranging from about 12% to 20% by weight.

References Cited

UNITED STATES PATENTS

| | | | |
|---|---|---|---|
| 3,541,055 | 11/1970 | Malamet et al. | 260—17 R |
| 3,694,388 | 9/1972 | Connelly et al. | 260—17 R |
| 3,696,063 | 10/1972 | Mott et al. | 260—17 R |

WILLIAM H. SHORT, Primary Examiner

L. M. PHYNES, Assistant Examiner

U.S. Cl. X.R.

117—132 C, 161 C; 260—23 EP, 30.6 R, 31.2 XA, 31.6, 31.8 E, 31.8 G